United States Patent
Lessard et al.

(10) Patent No.: US 7,673,537 B2
(45) Date of Patent: Mar. 9, 2010

(54) PARALLEL MANIPULATOR

(75) Inventors: Simon Lessard, La Prairie (CA); Ilian Bonev, St-Lambert (CA); Pascal Bigras, Montréal (CA)

(73) Assignee: Socovar, Société En Commandite, Montréal (CA)

( * ) Notice: Subject to any disclaimer, the term of this patent is extended or adjusted under 35 U.S.C. 154(b) by 0 days.

(21) Appl. No.: 12/131,192

(22) Filed: Jun. 2, 2008

(65) Prior Publication Data

US 2008/0295637 A1 Dec. 4, 2008

Related U.S. Application Data

(60) Provisional application No. 60/941,296, filed on Jun. 1, 2007.

(51) Int. Cl.
*B25J 17/00* (2006.01)
(52) U.S. Cl. .................. 74/490.01; 74/490.05; 901/15; 901/16
(58) Field of Classification Search ............... 74/479.01, 74/490.01, 490.03, 490.05, 490.07, 490.06; 414/735, 917; 901/16, 17, 15
See application file for complete search history.

(56) References Cited

U.S. PATENT DOCUMENTS

| | | | |
|---|---|---|---|
| 5,673,595 A | 10/1997 | Hui et al. | |
| 6,047,610 A | 4/2000 | Stocco et al. | |
| 6,116,844 A | 9/2000 | Hayward | |
| 6,339,969 B1 | 1/2002 | Salcudean et al. | |
| 7,086,307 B2 * | 8/2006 | Gosselin et al. | .......... 74/490.06 |
| 2006/0196299 A1 * | 9/2006 | Taboada et al. | .......... 74/490.01 |

FOREIGN PATENT DOCUMENTS

| | | |
|---|---|---|
| JP | 2006066723 | 3/2005 |
| WO | WO 2006/106165 | 10/2006 |

OTHER PUBLICATIONS

Frisoli, Antonio, Prisco, Giuseppe M., Salsedo, Fabio, Bargamasco, Salsedo, *A Two Degrees-of-Freedom Planar Haptic Interface with High Kinematic Isotropy*, proceedings of 1999 IEEE International Workshop on Robot and Human Interaction, Pisa, Italy, Sep. 1999.
Li, Qinchuan, Huang, Zhen, *Type Synthesis of 4-DOF Parallel Manipulators*, proceedings of 2000 IEEE International Conference on Robotics and Automation, Taipei, Taiwan, Sep. 14-19, 2003.

* cited by examiner

*Primary Examiner*—Richard W L Ridley
*Assistant Examiner*—Phillip Johnson
(74) *Attorney, Agent, or Firm*—Ogilvy Renault LLP

(57) ABSTRACT

A manipulator for supporting and displacing an object comprises a base. A moving portion supports the object. Two articulated mechanisms each having five rotational joints between links, with each articulated mechanism being connected to the base by two of the rotational joints. The moving portion is connected to both the articulated mechanisms by moving-portion joints. The articulated mechanisms and moving-portion joints are arranged with respect to each other between the base and the moving portion so as to constrain movement of the moving portion to displacements in two translational degrees of freedom and two rotational degrees of freedom with respect to the base. Four actuators are each operatively connected to a different one of the rotational joints between the base and the articulated mechanisms so as to selectively control the displacements of the moving portion in any one of the four degrees of freedom of the moving portion.

9 Claims, 2 Drawing Sheets

PARALLEL MANIPULATOR

CROSS-REFERENCE TO RELATED APPLICATION

The present patent application claims priority on U.S. Provisional Patent Application No. 60/941,296, filed on Jun. 1, 2007.

BACKGROUND OF THE APPLICATION

1. Field of the Application

The present application relates to robotic manipulators and, more particularly, to such manipulators constructed to control the movement of an end-effector with at least two translational and two rotational degrees of freedom, and composed of articulated arms connecting the end-effector to a base.

2. Background Art

Various designs of robotic manipulators exist for controlling the movement of an end-effector with six or fewer degrees of freedom (DOFs). Among these designs, so-called parallel manipulators are becoming increasingly popular.

In a parallel manipulator, an end-effector (i.e., moving portion, output portion) is connected to a base through at least two articulated arms. Often, the joint of each articulated arm that connects directly to the base is actuated. Thus, the actuators of a parallel manipulator are usually fixed to the base, and this reduces significantly the weight of the moving parts of the parallel manipulator and allows higher accelerations at the end-effector.

One of the less-discussed advantages of parallel manipulators is the versatility of their designs. There exists an optimal design for every particular motion pattern. There are parallel wrists for applications that require orienting an object. There are parallel manipulators for applications that require positioning with one orientational (i.e., rotational) and three translational DOFs, and so on. There are also parallel manipulators for applications that require a specific workspace volume (for example, an unlimited rotation about an axis or large displacements along a given axis, etc.). Often, these parallel manipulators comprise five-bar mechanisms.

U.S. Pat. No. 6,047,610, issued Apr. 11, 2000 to Stocco et al., entitled "Hybrid Serial/Parallel Manipulator," discloses a manipulator having three translational and two rotational DOFs. It consists of two five-bar mechanisms (each actuated by two motors) that pivot about the axes of their base bars. The two five-bar mechanisms are connected to the end-effector through universal joints. It basically registers the position and orientation of a handle, but not the rotation about the handle's axis. This manipulator is redundantly actuated, which inevitably increases the complexity of the control system and, most importantly, the manufacturing cost of the whole unit.

U.S. Pat. No. 6,116,844, issued Sep. 12, 2002 to Hayward, entitled "Mechanisms for Orienting and Placing Articles," discloses a parallel manipulator having one translational and three rotational DOFs. The parallel manipulator has two five-bar mechanisms (each actuated by two motors) that pivot passively about the axes of their base bars and are connected to a T-shaped end-effector whose extremity runs through a universal-cylindrical joint assembly. In this manipulator, none of the motors is fixed to the base.

U.S. Pat. No. 5,673,595, issued Oct. 7, 1997 to Hui et al., entitled "Four Degree-of-Freedom Manipulator," discloses a parallel manipulator composed of two five-bar mechanisms moving in parallel planes, whose extremities are connected through a serial triple-revolute-joint chain. A body attached at the middle revolute joint of this chain would therefore have one rotational and three translational DOFs. In this manipulator, an end-effector such as a handle (as in a haptic device) or a suction cup (as in a material-handling robot) cannot be easily attached at the middle revolute joint of the triple-revolute-joint chain. Furthermore, this manipulator has a lock-up singularity when the axes of the extremity joints of both five-bar mechanisms coincide.

U.S. Pat. No. 6,339,969, issued Jan. 22, 2002 to Salcudean et al., entitled "Three-Degree-of-Freedom Parallel Planar Manipulator," discloses a parallel manipulator having three DOFs in a plane. The manipulator is composed of two five-bar mechanisms moving in parallel planes, whose extremities are connected through a link of constant length. This manipulator registers the position and orientation of a handle moving in a plane. This manipulator is redundantly actuated, which inevitably increases the complexity of the control system and, most importantly, the manufacturing cost of the whole unit.

International Publication No. WO 2006106165, published Oct. 12, 2006, by Nabat et al., entitled "Unlimited-Rotation Parallel Robot with Four Degrees of Freedom," discloses a parallel manipulator having one orientational and three translational DOFs. The manipulator is composed of two five-bar mechanisms moving in parallel planes, whose extremities are connected through two articulated links, one of which passes through one of the extremities via a cylindrical joint. In this manipulator, the cylindrical joint is subject to lateral forces which increase the friction forces. Indeed, the inventors have eventually constructed a different version of their manipulator, replacing one of the five-bar mechanisms with a more complex mechanical system.

Japanese Publication No. JP2005066723, published Mar. 17, 2005, by Okamoto and Sakaguchi, entitled "Parallel Robot with Four Degrees of Freedom," discloses a parallel manipulator having two translational and two rotational degrees of freedom. The manipulator is composed of two five-bar mechanisms actuated with linear motors and moving in parallel planes, whose extremities have hollow spherical joints through which a tool holder passes. This manipulator uses linear actuators, which make the manipulator more cumbersome. Furthermore, hollow spherical joints are difficult to manufacture and increase the cost of the manipulator.

The publication "A Two Degrees-of-freedom Planar Haptic Interface with High Kinematic Isotropy," by Frisoli et al. [Proceedings of 1999 IEEE International Workshop on Robot and Human Interaction, Pisa, Italy] presents a parallel manipulator having two translational and two orientational DOFs. The translational DOFs are active, while the rotational DOFs are passive. The manipulator is composed of a single five-bar mechanism. An unactuated so-called remote-center-of-rotation mechanism is mounted on the extremity of the five-bar mechanism and holds a pen-shaped end-effector. The manipulator is used as a haptic pen that can measure and control the motion on a paper plane while measuring the pressure of the pen exerted by the user along the pen axis. A haptic pen is suitable for applications such as teaching drawing or handwriting, or for rehabilitation. In this particular device, the orientation of the pen is not controllable.

Of all the dozens of parallel manipulator designs, very few are aimed at controlling the movement of an end-effector with two translational and two rotational degrees of freedom, as the invention disclosed in Japanese Publication No. J-P2005066723. Such parallel manipulators can be used as haptic devices, for example, to simulate the motion of a pen along a piece of paper, or they can be used as a subsystem of a five- or six-DOF manipulator. For example, the manipulator disclosed in Japanese Publication No. JP2005066723 can be mounted on a vertical axis and thus serve as a 5-axis machine tool.

The publication "Type Synthesis of 4-DOF Parallel Manipulators," by Qinchuan Li and Zhen Huang [Proceedings of 2003 IEEE International Conference on Robotics & Automation, Taipei, Taiwan], discloses two such 4-DOF parallel manipulators, one of which consists of four identical arms each composed of five revolute joints connected in series. While this manipulator is theoretically attractive, it is of relatively small practical interest, since its design is cumbersome and its proper functioning relies on strict manufacturing tolerances. Furthermore, the kinematics of such a manipulator are complex.

SUMMARY

It is therefore an aim of this application to provide a novel parallel manipulator.

It is a further aim of the present invention to provide a parallel manipulator capable of, amongst other features, controlling the position of the tip of a tool-holder along a plane and the direction of the axis of the tool-holder, while addressing issues associated with prior-art manipulators.

Therefore, in accordance with the present application, there is provided a manipulator for supporting and displacing an object, comprising: a base; a moving portion adapted to support the object; at least two articulated mechanisms each having at least five rotational joints between links, with each articulated mechanism being connected to the base by two of said rotational joints, the moving portion being connected to both said articulated mechanisms by moving-portion joints, the articulated mechanisms and moving-portion joints being arranged with respect to each other between the base and the moving portion so as to constrain movement of the moving portion to displacements in two translational degrees of freedom and two rotational degrees of freedom with respect to the base; and at least four actuators being each operatively connected to a different one of the rotational joints between the base and the articulated mechanisms so as to selectively control the displacements of the moving portion in any one of the four degrees of freedom of the moving portion.

Further in accordance with the present application, there is provided a manipulator for receiving and displacing an object, comprising a moving portion adapted for receiving an object; four articulated arms each comprising a proximal and a distal link connected through a revolute joint, each articulated arm connected to a base through an actuated revolute joint, first pair of supporting arms being connected through a first distal revolute joint, second pair of supporting arms being connected through a second distal revolute joint, the axes of all ten revolute joints being parallel; a moving portion comprising a first and a second member, interconnected through a joint that allows only translation of first member with respect to second member along a given direction and possibly rotation of first member with respect to second member about an axis parallel to said given direction; means for attaching said first member to one of the two distal links in said first pair of interconnected articulated arms, allowing at least two rotational degrees of freedom; means for attaching said second member to one of the two distal links in said second pair of interconnected articulated arms, allowing at least two rotational degrees of freedom.

DESCRIPTION OF THE PREFERRED EMBODIMENTS

Figure 1:
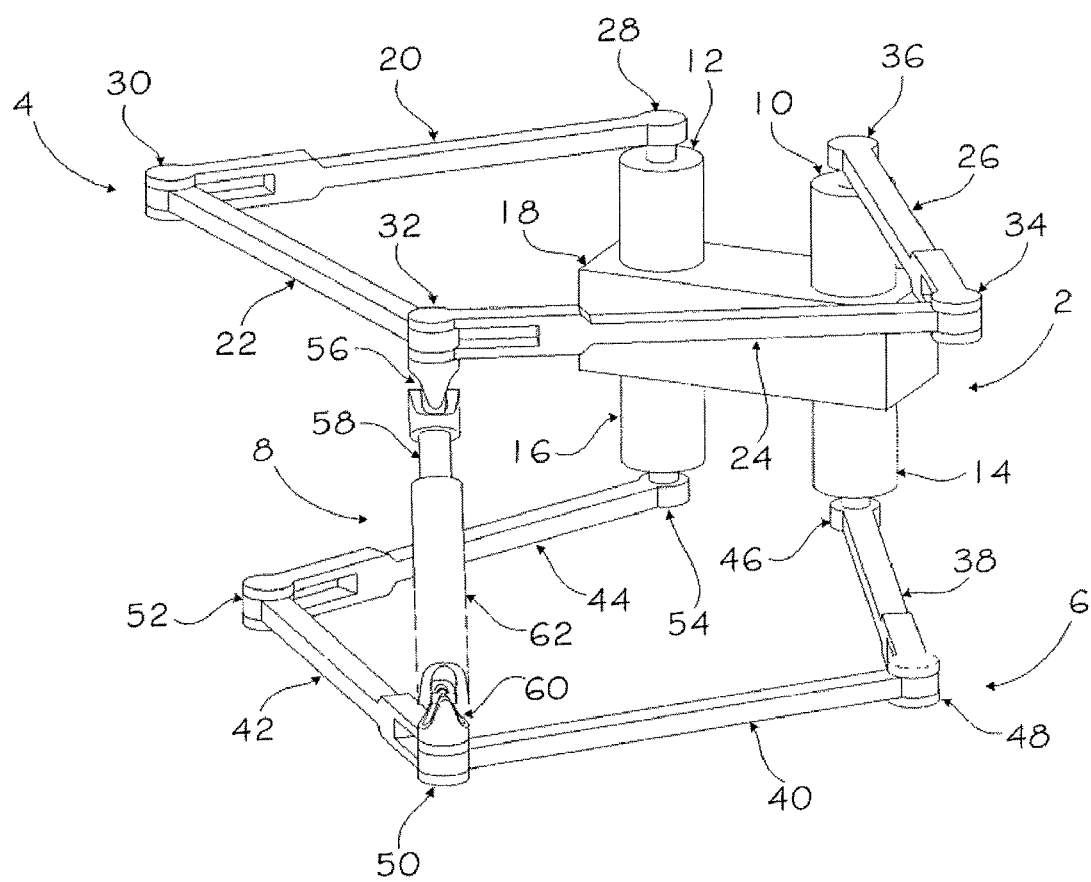
FIG. 1 is a perspective view of a four-DOF parallel manipulator in accordance with an embodiment of the present disclosure.

FIG. 1 shows a four-DOF (degree of freedom) parallel manipulator that can be directly used as a haptic device. The parallel manipulator has five-bar mechanisms 4 and 6, connected at one end to the base assembly 2, and arranged to support a moving portion or tool assembly 8 at the opposed end. The base assembly 2 is composed of base 18 that holds four motors, namely 10, 12, 14 and 16.

The first five-bar mechanism 4 is composed of links 20, 22, 24 and 26 and revolute joints 28, 30, 32, 34 and 36. A rotation of the links 20 and 26 is actuated by the motors 12 and 10 at the joints 28 and 36, respectively. The joints 30, 32 and 34 are passive revolute joints.

The second five-bar mechanism 6 is composed of links 38, 40, 42 and 44 and joints 46, 48, 50, 52 and 54. A rotation of the links 38 and 44 is actuated by the motors 14 and 16 at the joints 46 and 54, respectively. The joints 48, 50 and 52 are passive revolute joints.

The axes of all ten revolute joints of the two five-bar mechanisms 4 and 6 are parallel. Thus, the two five-bar mechanisms 4 and 6 are each displaceable in a plane of motion, and the plane of motion of the first five-bar mechanism 4 is parallel to the plane of motion of the second five-bar mechanism 6.

In the embodiment of FIG. 1, the tool assembly 8 is composed of a linear or cylindrical passive joint (part of moving-portion joints), having links 58 and 62 telescopically assembled to provide a translational DOF therebetween. The tool assembly 8 is connected at opposed ends to the five-bar mechanisms 4 and 6. More specifically, a universal joint 56 (or like joint, part of the moving-portion joints) relates the joint 32 of the five-bar mechanism 4 to the link 58 of the tool assembly 8. Similarly, a universal joint 60 (or like joint, part of the moving-portion joints) relates the joint 50 of the five-bar mechanism 6 to the link 62 of the tool assembly 8. The moving-portion joints 56 and 60 are free to rotate at their connecting points with the revolute joints 32 and 50.

The exterior linkage of the passive joint of the tool assembly 8, namely the link 62, is preferably used as the output portion, and is restricted to motion along two rotational DOFs and two translational DOFs by the five-bar mechanisms 4 and 6. In one embodiment, the lower part 62 of the linear passive joint can serve as a haptic pen since it is the exterior linkage of the joint.

Figure 2:
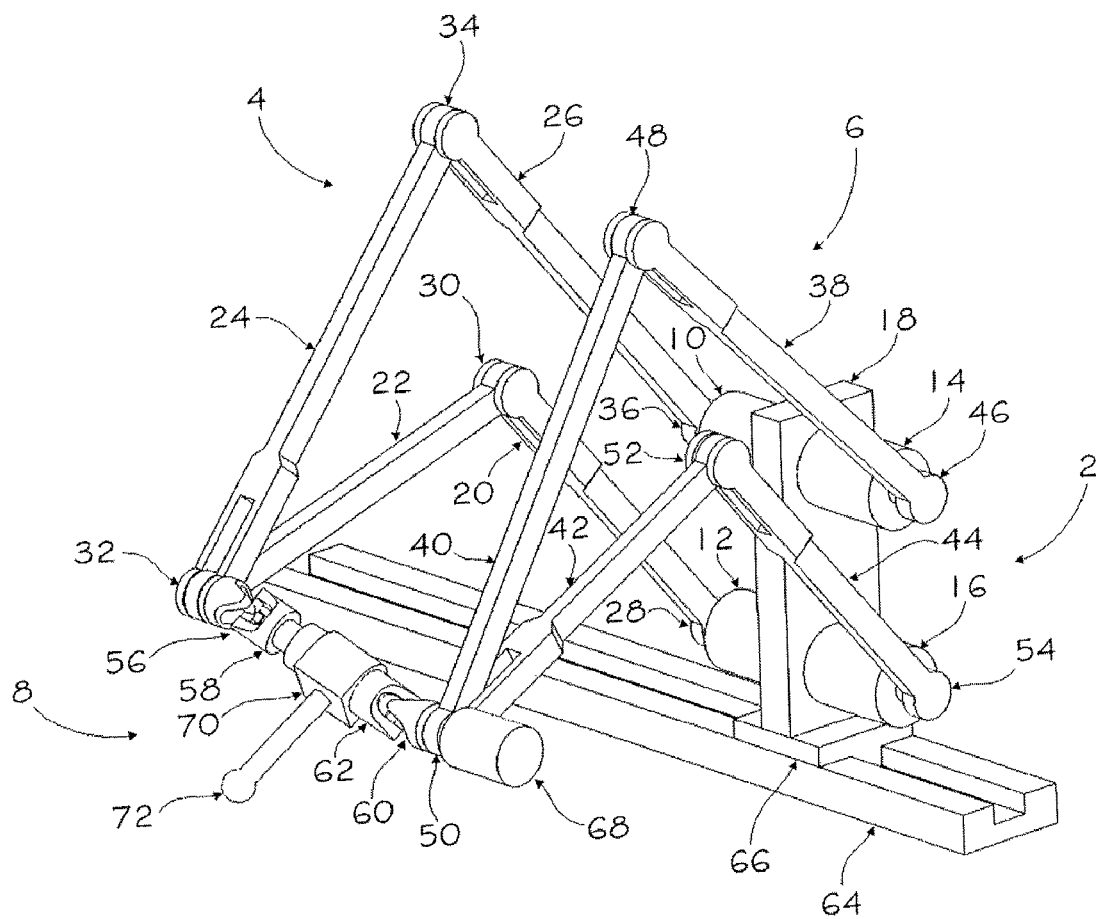
FIG. 2 is a perspective view of the four-DOF parallel manipulator of FIG. 1, in a 6-DOF configuration.

FIG. 2 shows the four-DOF parallel manipulator of FIG. 1 as part of a six-DOF parallel manipulator. The central portion of the manipulator is as described for FIG. 1. The free rotation of link 62 about its longitudinal axis is now actuated by motor 68. In the embodiment of FIG. 2, the motor 68 is attached to link 42 and rotates the output portion of the tool assembly 8 (namely the link 62) via the universal joint 60 pivotally mounted to the joint 50. Accordingly, the additional rotational DOF is provided for the link 62.

In the embodiment of FIG. 2, a linear actuator consists of track 64 and carriage 66. The base 18 is fixed on the carriage 66, this assembly being actuated along a linear direction on track 64, to provide the additional translational DOF to the parallel manipulator. The direction of linear displacement of the carriage 66 is normal to the plane of motion of both five bar mechanisms 4 and 6.

A tool 72 is attached on the link 62 via a face plate 70. The tool 72 is displaceable along 6 DOFs relatively to the track 64.

Such parallel manipulators can be used for various industrial applications (welding, cutting, machining) as well as for medical applications (ultrasound examination of lower-limb members).

Although the parallel mechanism is illustrated as having a double-five-bar mechanism configuration, it is considered to provide the parallel mechanism with inactive joints, to provide articulated mechanisms other than the five-bar mechanisms but operating in similar fashion.

We claim:

1. A manipulator for supporting and displacing an object, comprising:
   a base;
   a moving portion adapted to support the object;
   at least two articulated mechanisms each having at least five rotational joints between links, with the axes of each the at least five rotational joints of both the articulated mechanisms all being permanently parallel to one another, with each articulated mechanism being connected to the base by two of said rotational joints, the moving portion being connected to both said articulated mechanisms by moving-portion joints, the articulated mechanisms and moving-portion joints being arranged with respect to each other between the base and the moving portion so as to constrain movement of the moving portion to displacements in two translational degrees of freedom and three rotational degrees of freedom with respect to the base; and
   at least four actuators being each operatively connected to a different one of the rotational joints between the base and the articulated mechanisms so as to selectively control the displacements of the moving portion in any one of the two translational degrees of freedom and in two of the rotational degrees of freedom of the moving portion.

2. The manipulator according to claim 1, wherein the base is mounted to a linear actuator, whereby the moving portion is displaceable along three translational degrees of freedom and two rotational degrees of freedom by actuation of the actuators.

3. The manipulator according to claim 2, wherein the direction of the linear actuator is parallel to the axes of each of the at least five rotational joints of both said articulated mechanisms.

4. The manipulator according to claim 2, further comprising a rotational actuator connected to one of said moving-portion joints to actuate a rotation of the moving portion, whereby the moving portion is displaceable along three translational degrees of freedom and three rotational degrees of freedom.

5. The manipulator according to claim 1, further comprising a rotational actuator connected to one of said moving-portion joints to actuate a rotation of the moving portion, whereby the moving portion is displaceable along two translational degrees of freedom and three rotational degrees of freedom by actuation of the actuators.

6. The manipulator according to claim 1, wherein the two articulated mechanisms are five-bar mechanisms.

7. The manipulator according to claim 1, wherein the moving-portion joints comprise a pair of universal joints and anyone of a cylindrical joint and prismatic joint between the universal joints, the universal joints each being connected to one said rotational joint of the articulated mechanisms, the moving portion being secured to the one of the cylindrical joint and prismatic joint.

8. The manipulator according to claim 7, further comprising a rotational actuator connected to one of said universal joints to actuate a rotation of the moving portion, whereby the moving portion is displaceable along three translational degrees of freedom and three rotational degrees of freedom.

9. The manipulator according to claim 1, wherein the moving portion supports a tool.

* * * * *